United States Patent [19]
Fitzpatrick et al.

[11] Patent Number: 5,356,144
[45] Date of Patent: Oct. 18, 1994

[54] HAND-HELD LOTTERY NUMBER GENERATING DEVICE

[76] Inventors: James R. Fitzpatrick, 170 Morning Dew La., Stratford, Conn. 06497; Kevin W. Coyle, 302 Piedmont St., Waterbury, Conn. 06706

[21] Appl. No.: 917,868

[22] Filed: Jul. 21, 1992

[51] Int. Cl.⁵ .................................. G06F 1/02
[52] U.S. Cl. ................... 273/138 A; 273/148 R; 273/138 R; 364/412; 364/717
[58] Field of Search ........... 273/138 A, 138 R, 148 R, 273/146; 364/412, 717

[56] References Cited

U.S. PATENT DOCUMENTS

| | | | |
|---|---|---|---|
| 4,692,863 | 9/1987 | Moosz | 364/412 |
| 4,713,787 | 12/1987 | Rapp | 364/717 |
| 4,819,818 | 4/1989 | Simkus et al. | 273/138 A |
| 4,858,122 | 8/1989 | Kreisner | 273/138 A |
| 4,858,931 | 8/1989 | McKechnie | 273/138 A |
| 5,031,914 | 7/1991 | Rosenthal | 273/146 |
| 5,048,833 | 9/1991 | Lamle | 273/138 A |
| 5,102,134 | 4/1992 | Smyth | 273/138 A |
| 5,157,602 | 10/1992 | Fields et al. | 364/412 |
| 5,665,502 | 5/1987 | Kreisner | 273/138 A |

FOREIGN PATENT DOCUMENTS 0061052 9/1982 European Pat. Off. ........ 273/138 A

*Primary Examiner*—Jessica J. Harrison
*Assistant Examiner*—Kerry Owens
*Attorney, Agent, or Firm*—Cohen, Pontani, Lieberman, Pavane

[57] ABSTRACT

The present invention is a random number generating device (10) for generating a plurality of random numbers. The device comprises means for inputting at least one set of user defined parameters from which the plurality of random numbers are selected. In a preferred embodiment, the device is capable of generating random numbers pursuant to six stored games, four of which allow a user to input parameters, with the remaining two games capable of generating random numbers akin to numbers generated upon the rolling of a pair of dice and the spinning of a Roulette Wheel.

26 Claims, 15 Drawing Sheets

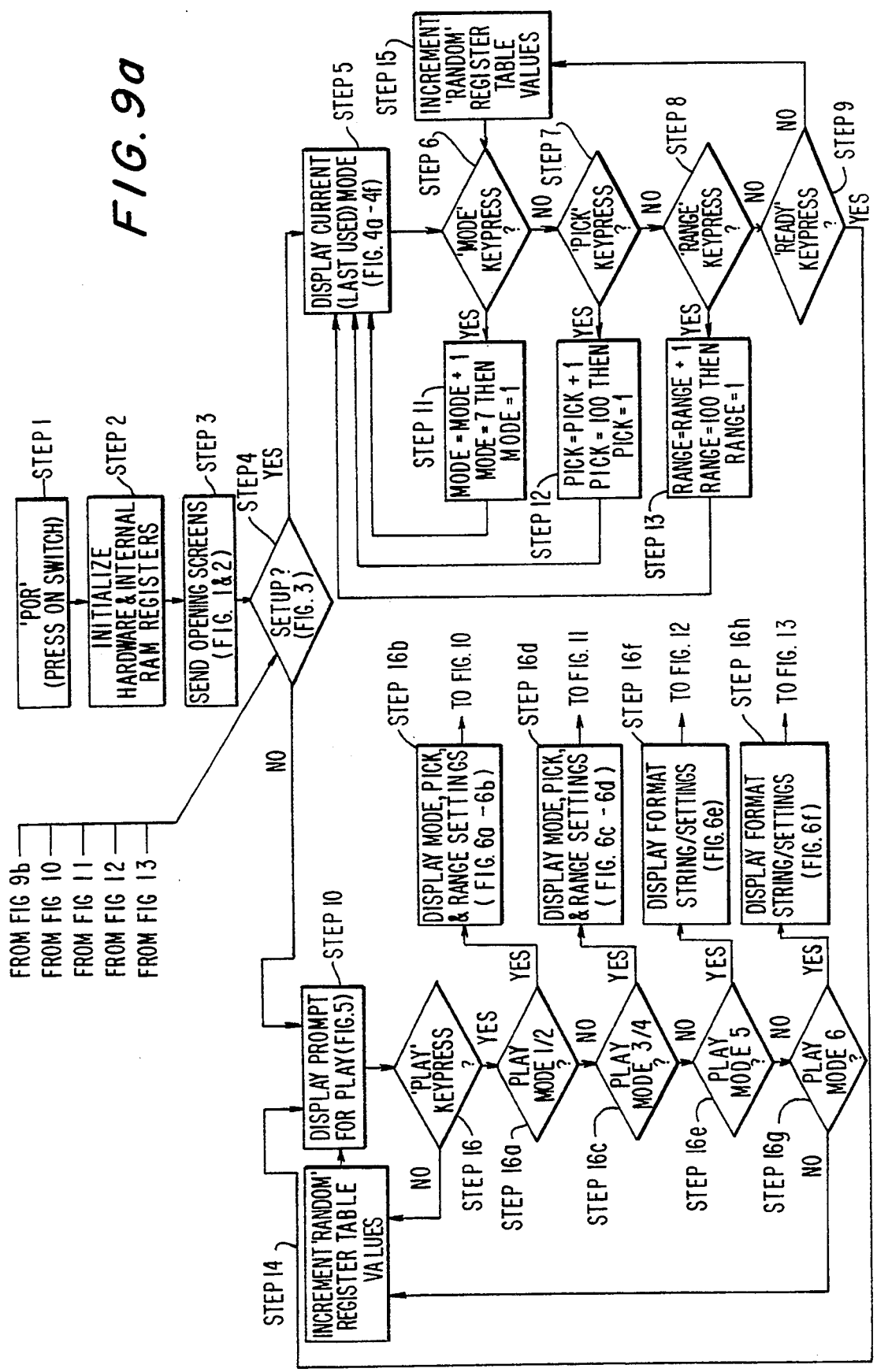

HAND-HELD LOTTERY NUMBER GENERATING DEVICE

BACKGROUND OF THE INVENTION

I. Field of the Invention

This invention pertains to hand-held random number generators for assisting a user in picking random numbers for playing numeric games of chance including Keno, Jai-Alai and various lottery games. More particularly, the present invention pertains to a hand-held random number generator capable of operating in six modes or games, four of which are user programmable and the remaining two of which are factory programmed for generating random numbers akin to the numbers generated from rolling a pair of dice and spinning a Roulette Wheel.

II. Prior Art

There are many situations in which it is desirable to select numbers at random. One such situation is for choosing numbers for various number games, such as lotteries. In this situation, it is desirable for a lottery participant to use a portable or hand-held random number generator for choosing random numbers. Several such portable random number generators exist. One such device is found in U.S. Pat. No. 4,858,122 (Kreisner). The Kreisner device is capable of operating in five pre-programmed modes with the user selecting the upper limit of the range from which the random numbers are chosen. The lower limit of the range is preset to 1. The five pre-programmed modes of this device allow a user to select a quantity of random numbers ranging from 3 to 6. The Kreisner device is limited in several respects. For example, if the first mode, which generates 3 random numbers, is selected, the random numbers chosen are all single digit numbers, i.e. the device does not provide the user with an option for selecting three double digit numbers such as, for example, 12, 20, 34, etc. This device is also limited by not providing the user with the ability to select more than six numbers at a time. Also, the device does not allow for selecting the minimum value of the range from which the random numbers are chosen.

Another portable random number generating device is found in U.S. Pat. No. 4,692,863 (Moosz). This device is capable of operating in a weighted mode and a random mode. When operated in the weighted mode, the user enters a plurality of favorite numbers into a memory array and some of the random numbers generated are chosen from this array. When operated in the random mode, the device, like the Kreisner device above, is limited in that it only allows the user to select between a minimum of three random numbers and a maximum of six random numbers. In other words, this device is not capable of selecting a quantity of random numbers greater than six or less than three, thereby limiting its uses.

As discussed above, the prior art portable random number generators have substantial limited capabilities. Therefore, it is desirable to have a hand-held random number generating device with user programmable capabilities for allowing the user to define a range from which the random numbers will be chosen as well as allowing the user to have full control over the quantity of numbers generated. Accordingly, it is an object of the present invention to provide a hand-held random number generating device comprising multiple separate and distinct modes of operation for allowing a user to program a separate set of parameters for each mode and wherein each set of parameters comprises; (i) a range from which the random numbers are selected, (ii) a quantity of random numbers selected and, (iii) an instruction for allowing duplicate numbers within the number of random numbers.

It is another object of the invention to provide, in addition to the user programmable modes, a first fixed game for generating random numbers simulating numbers generated upon the rolling of a pair of dice.

It is a further object of the invention to provide a second fixed game for generating random numbers and their corresponding colors akin to the numbers generated upon the spinning of a Roulette Wheel.

It is a still further object of the invention to provide a portable random number generating device capable of displaying programmed messages for allowing a user to determine whether an instant prize has been won.

SUMMARY OF THE INVENTION

Broadly speaking, the present invention is a random number generating device for generating a plurality of random numbers, comprising: means for inputting at least one set of user defined parameters for the plurality of random numbers, the set of parameters comprising, a range having a lower limit defining a minimum number value and an upper limit defining a maximum number value, the amount of random numbers in the plurality of random numbers, and means for optionally precluding duplication of numbers in the plurality of random numbers. The device also comprises means for storing at least one set of user defined parameters, means responsive to the set of user defined parameters for generating the plurality of random numbers and means for outputting the generated plurality of random numbers.

In the preferred embodiment, the device is capable of generating numbers pursuant to the user defined parameters as well as generating numbers pursuant to two fixed modes of operation. These fixed modes allow for the generation of random number combinations akin to numbers generated upon the rolling of a pair of dice as well as the generation of random numbers, and their corresponding colors, akin to numbers generated upon the spinning of a Roulette Wheel.

Also according to the present invention is a method of selecting random numbers from a random number generator for use in various numeric games of chance including Keno, Jai-Alai and various lotteries comprising the steps of: inputting at least one set of user defined parameters, the set of parameters comprising, a range having a lower limit defining a minimum number value and an upper limit defining a maximum number value, an amount of random numbers in the plurality of random numbers, and an instruction for optionally precluding duplication of numbers in the plurality of random numbers; storing the set of user defined parameters, generating the plurality of random numbers responsive to the stored set of user defined parameters, and outputting the generated plurality of random numbers.

The foregoing as well as additional details of the present invention will be more fully apparent from the following detailed description and annexed drawings of the presently preferred embodiment thereof.

BRIEF DESCRIPTION OF THE DRAWINGS

FIG. 9a is a flow chart showing the "power-on/reset" function of the device software;

DETAILED DESCRIPTION OF THE PREFERRED EMBODIMENT

Figure 14:
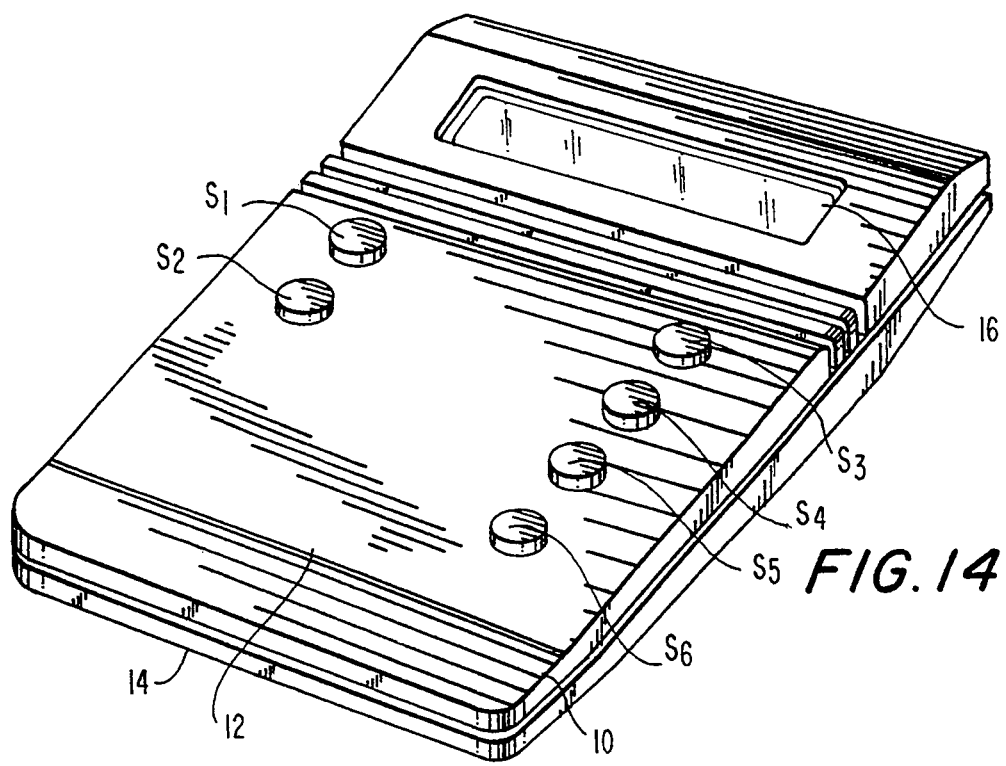
FIG. 14 is a perspective view of the device in accordance with the present invention.
Figure 15:
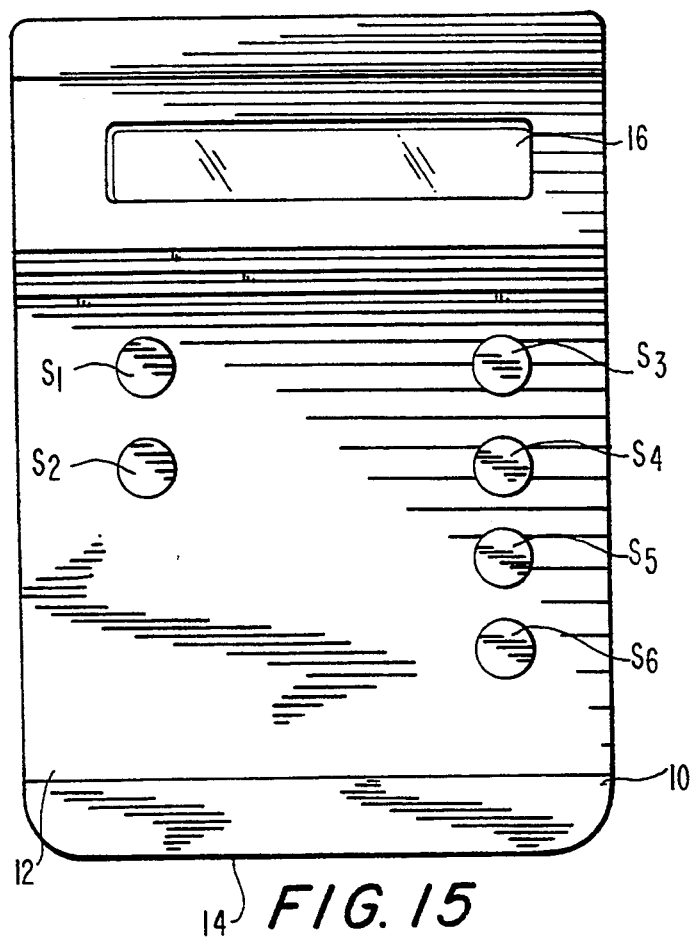
FIG. 15 is a top plan view of the device shown in FIG. 14.
Figure 16:
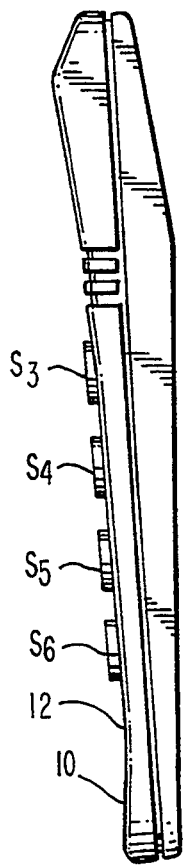
FIG. 16 is a side view of the device shown in FIG. 14.

Referring now to the drawings and initially to FIGS. 14–16, the device in accordance with the present invention is generally designated at 10. The device 10 has a housing 12 in the shape of a conventional pocket calculator having a front face portion 14. As shown, the device 10 has an output device, such as a liquid crystal display 16, and an input device, such as six user activated function keys, S1–S6. It will be appreciated, that other suitable means can be utilized as input devices or output devices. The function keys are shown positioned in two columns in FIG. 14 but may also be positioned in a row along the bottom of the front face portion 14 of housing 12, as shown in FIGS. 1–7b. Also as shown, function keys S1–S6 have instructional words in proximity thereto, with some keys assigned one or two functions depending on which mode or game the device is operated in. For example, function key S1 turns the device on whereas function key S3 performs both the "play" and "zero" functions. The use of the function keys will be more fully explained below.

The device 10 is capable of operating in six separate and distinct modes or games. Games 1–4 are user programmable in that the user inputs different sets of user-defined parameters for governing the random numbers selected in each game. Each set of user-defined parameters consists of a range from which the random numbers are chosen as well as a quantity, i.e. the amount of random numbers chosen. The range has an upper limit defining the maximum number value and a lower limit defining the minimum number value. The lower limit can be any value but in the preferred embodiment, the lower limit may be adjusted to either of 0 and 1. The device has the capacity for allowing the upper limit to be between the lower limit and $10^{37}$ but, in the preferred embodiment the maximum upper limit value is fixed to 99.

Games 1 and 2 are pre-programmed with a repeat function, i.e. two or more numbers within the quantity of numbers chosen in these games may be duplicates. Conversely, games 3 and 4 are pre-programmed with a non-repeat function, i.e. no two numbers within the quantity of random numbers generated in these games will be duplicates. Furthermore, game 5 has pre-programmed parameters for generating random numbers akin to numbers generated upon the rolling of a pair of dice. Game 6 likewise has pre-programmed parameters for generating random numbers akin to numbers generated upon the spinning of a Roulette Wheel. The colors red, black and green corresponding to the numbers generated from game 6 are also displayed.

Figure 8A:
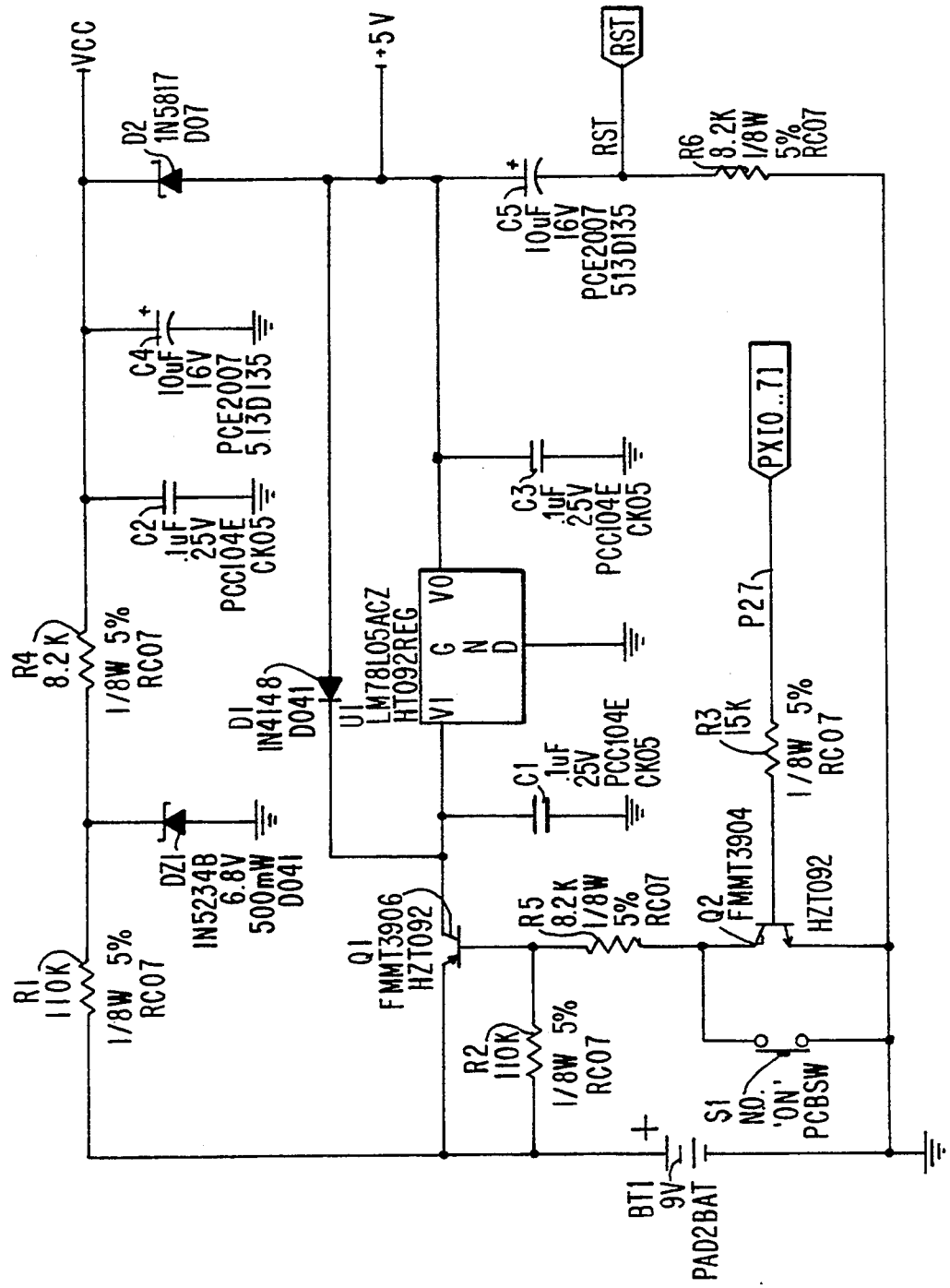
FIGS. 8a–8c are schematic diagrams of the present invention.
Figure 8B:
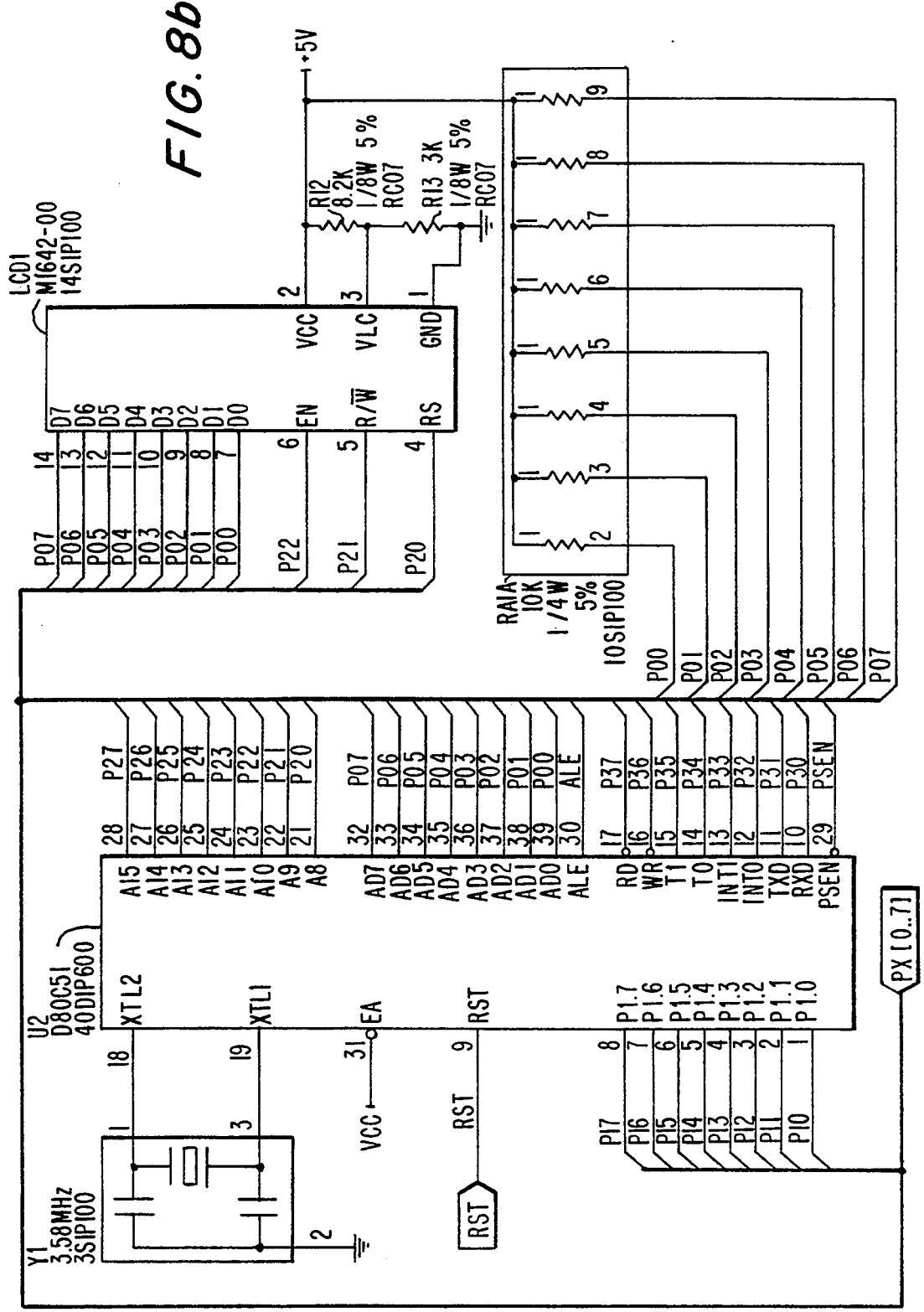
Figure 8C:
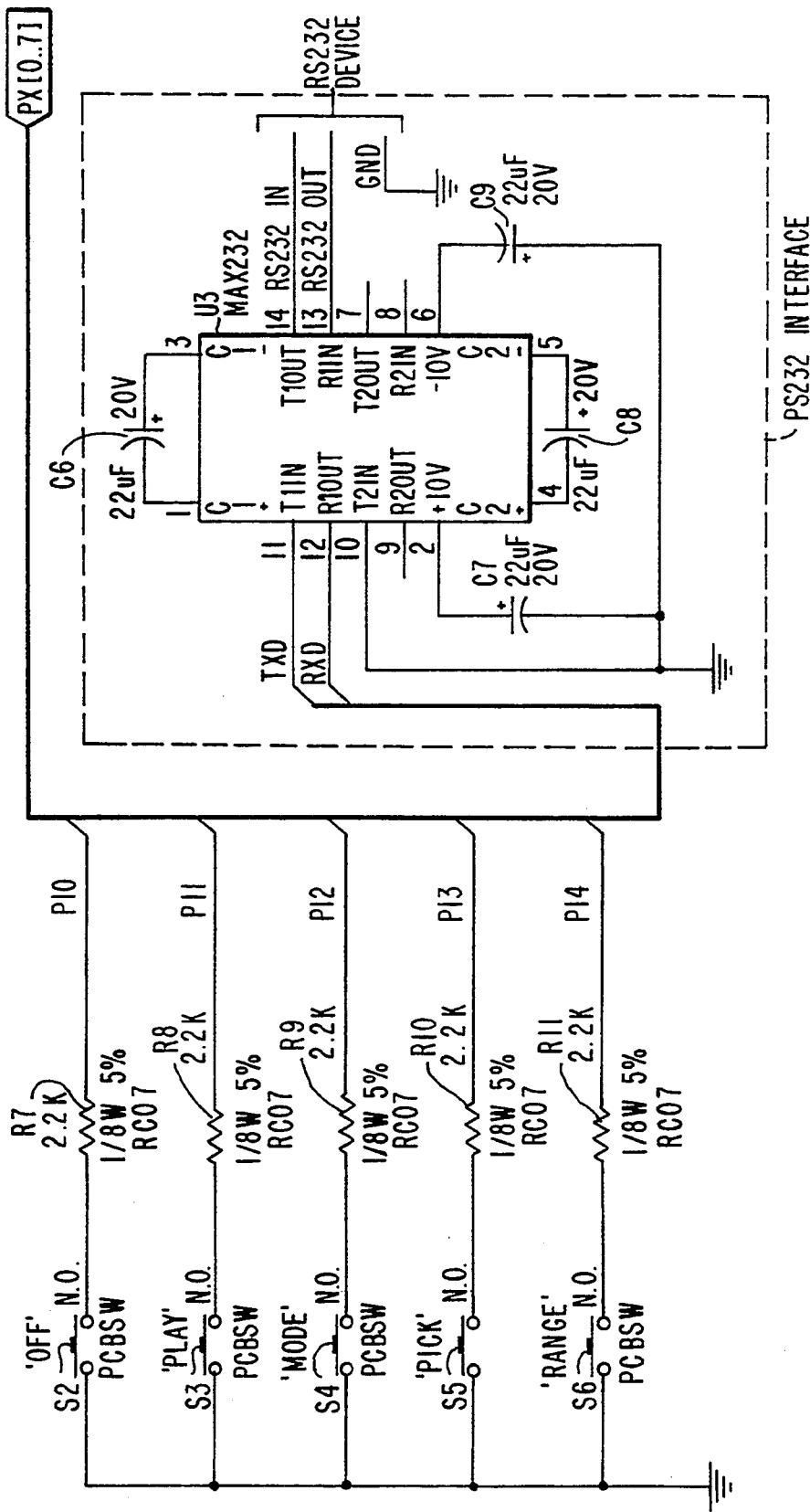

Referring now to FIGS. 8a–8c, a schematic diagram of the circuitry of the device is provided. The circuit of FIG. 8a performs the power on, memory backup, automatic shut-off and voltage regulator functions. As shown, the device is powered by a 9 volt battery BT1, but an alternative power supply may be substituted therein. For example, a solar cell or an AC adapter may be used and, to accommodate the later, an AC power jack (not shown) is provided. The voltage regulator circuit utilizes microchip U1 which, when configured as shown in FIG. 8a, supplies a constant 5 volts to the remainder of the device circuitry of FIGS. 8b and 8c.

In FIG. 8b, the microcontroller chip U2 is shown interfaced with a clock circuit Y1 and a liquid crystal display LCD1. Pins P00–P07 are pulled up to 5 volts through resistor bank RA1A to prevent them from floating. The random numbers are generated by a microcontroller U2 which contains read only memory (ROM) for storing the instructions for generating random numbers. The read only memory (ROM) also stores the parameters for playing games 5 and 6. The microcontroller U2 also contains random access memory (RAM) for storing user inputted parameters for playing games 1–4, variable tables and areas required for microcontroller U2 operation. It should be readily apparent to those of ordinary skill in the art that microcontroller U2 can be substituted with a microprocessor interfaced with external (RAM) and (ROM). Due to the memory backup circuit, shown in FIG. 8a, the microcontroller random access memory (RAM) continues to retain data inputted therein as long as power remains connected to the microcontroller U2, i.e. even if function key S2 (off) is selected.

Figure 9B:
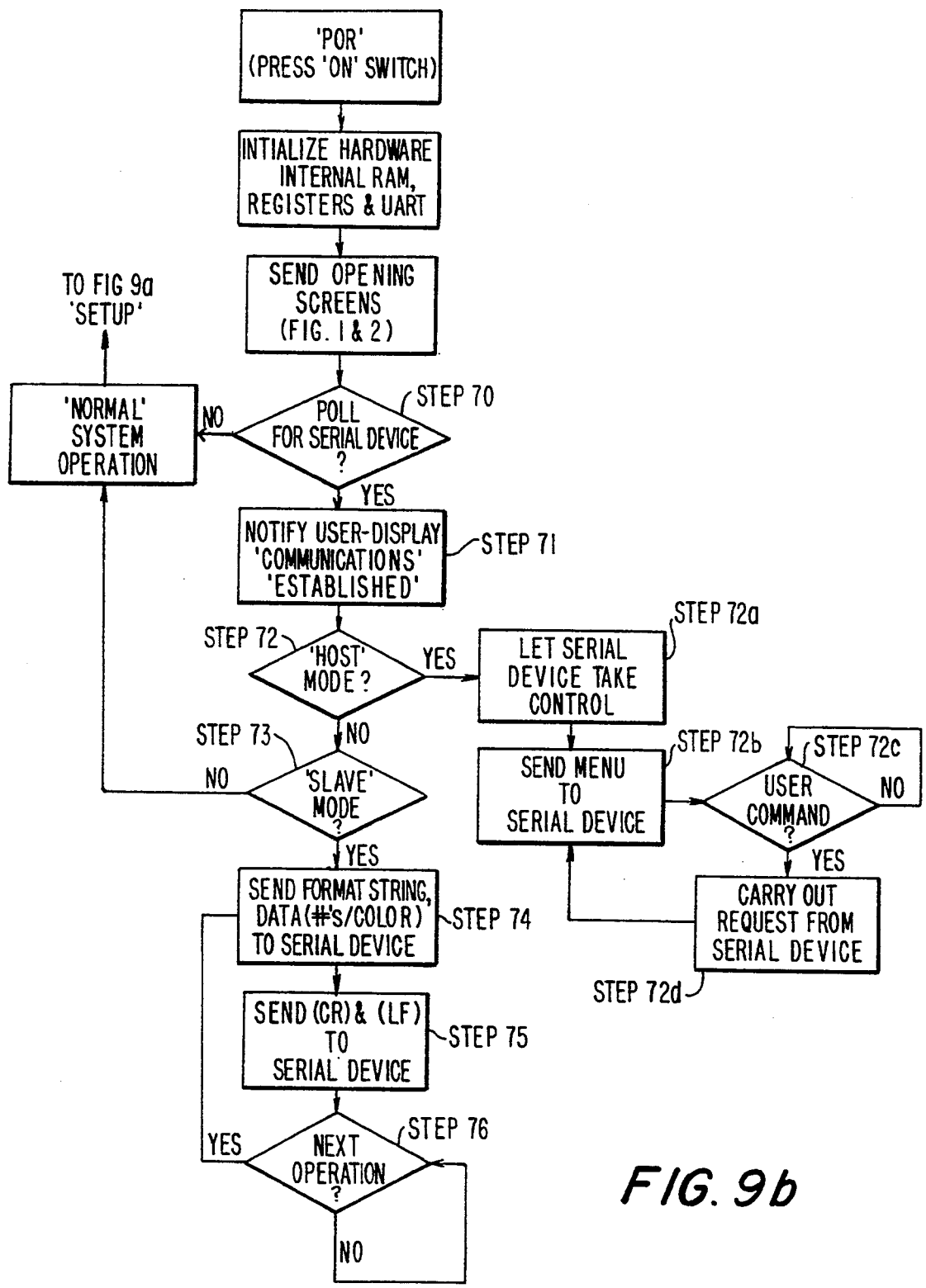
FIG. 9b is a flow chart of the device software operation for a host/slave configuration.

The device provides an input/output port for interfacing with external items such as printers and computers (not shown). Specifically, a standard RS232, which is known to one of ordinary skill in the art, is shown in FIG. 8c. However, as can be readily appreciated, other means for interfacing can be provided such as a standard RS422/485 interface for interfacing the device with multiple printers and/or computers. When interfaced, the device communicates with these items as shown in the flow chart of FIG. 9b which will be discussed hereinbelow.

Figure 1:
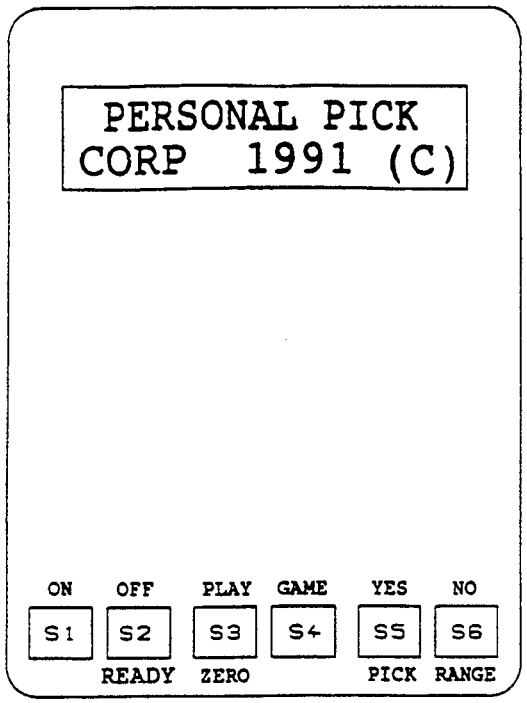
FIG. 1 is a top plan view of the device in accordance with the present invention showing an initial message on a liquid crystal display.
Figure 2:
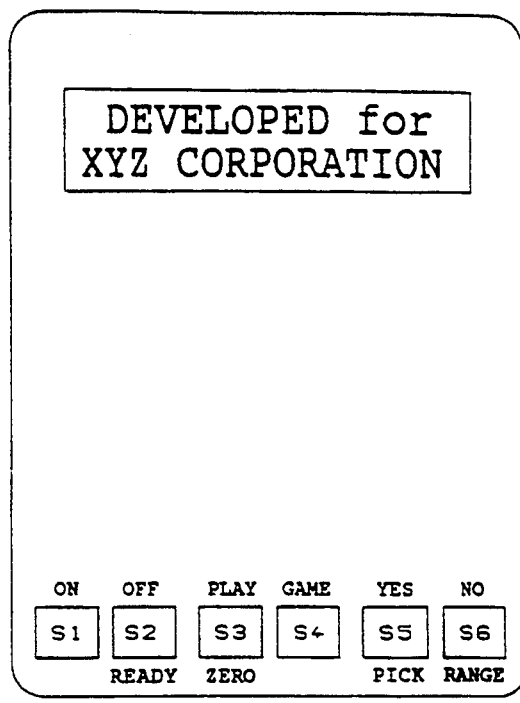
FIG. 2 is a top plan view of the device showing another message on the liquid crystal display.
Figure 3:
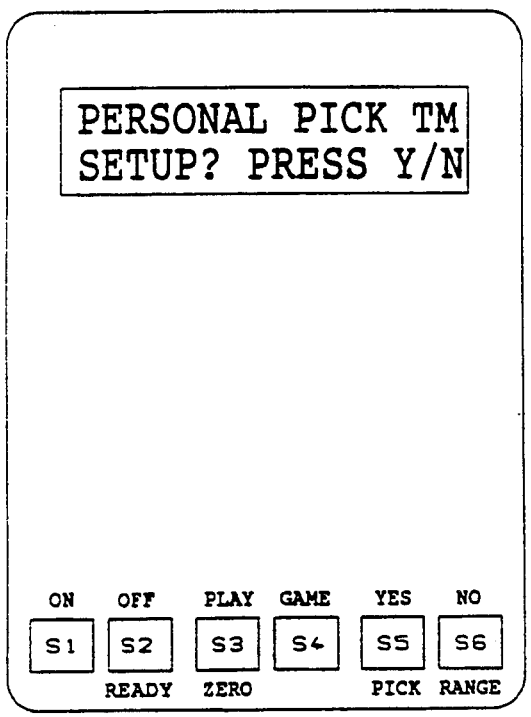
FIG. 3 is a top plan view of the device showing a user prompt message on the liquid crystal display.

While the information depicted in the flow charts in FIGS. 9a–13 will be readily understood by those of ordinary skill in the art, a brief description of the device is nonetheless herein provided. With reference to FIGS. 1–7b and the flow chart of FIG. 9a, power is supplied to the device by selecting function key S1 (on) (see step 1 of FIG. 9a). The microcontroller briefly runs through a series of diagnostic tests and then displays a series of messages on the liquid crystal display 16 as shown in steps 2 and 3. The first message is shown in FIG. 1. This message is displayed for a predetermined time and is followed by a second message shown in FIG. 2. Likewise, this message is displayed for another predetermined time and then changes to the user prompt message shown in FIG. 3, (see step 4 of FIG. 9a). This message remains displayed until the user inputs the desired instruction, i.e. (yes/no).

Front step 4, the user may choose between playing the previously played game or, in the alternative, entering the "setup" mode. The "setup" mode is entered by selecting function key S5 (yes/pick) thus allowing the user to enter user-defined parameters into the device such as the amount of random numbers desired and the range from which these numbers are chosen, (see steps 6, 7 and 8 in FIG. 9a). If, however, the function key S6 (no/range) is selected (step 10), the user enters the "play" mode wherein the random numbers selected will be in accordance with the last game played. Note that when the device is awaiting user interaction, the random register table values, front which the random numbers are generated, continue to be incremented as shown in steps 14 and 15 of FIG. 9a.

Figure 4A:
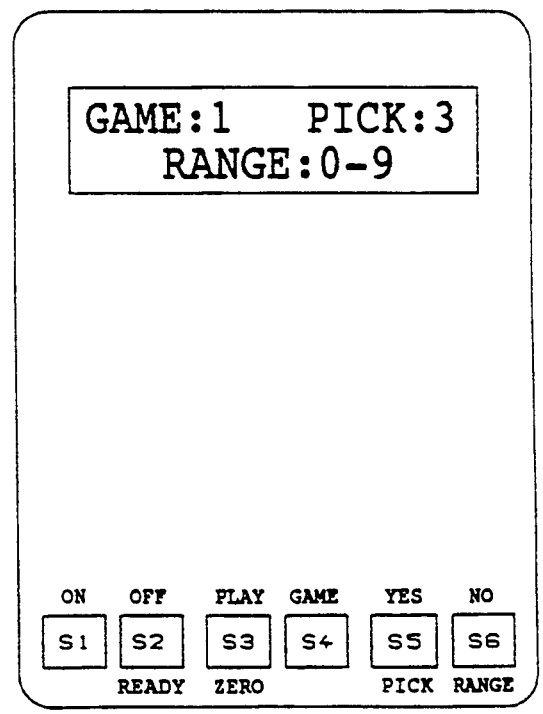
FIGS. 4a–7b are top plan views of the device showing various messages displayed on the liquid crystal display.
Figure 4B:
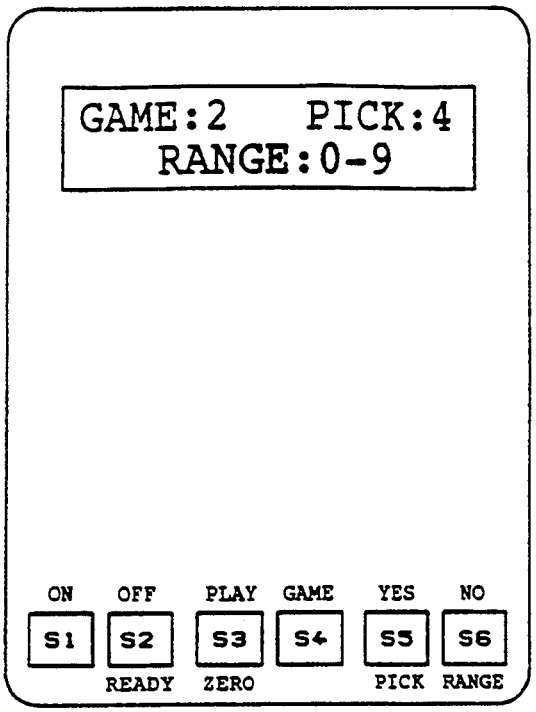

Assuming function key S5 (yes/pick) is selected, the "setup" mode will now be discussed with reference to FIG. 9a. The "setup" mode allows the user to define the parameters of each game by performing a series of steps. It should be remembered that, of the four programmable games, only games 1 and 2 are capable of generating repeat numbers wherein games 3 and 4 are incapable of generating repeat numbers. Therefore, if the user wishes to generate repeat numbers, function key S4 (game) will be selected for displaying games 1 or 2 as shown in FIGS. 4a and 4b. Function key S4 (game) scrolls through all 6 games. Therefore, if the device is displaying game 6 and function key S4 is selected, the device wraps around to game 1. This is shown in steps 6 and 11 of FIG. 9a.

Assuming game 1 is selected, the user will then input the parameters, i.e. the range from which the random numbers will be generated and the amount of random numbers. The number of random numbers is selected by using function key S5 (pick), (step 8 of FIG. 9a). Each time S5 (pick) is selected, the amount of random numbers is incremented by one. This number will reach a maximum value of 99 and then wrap around to the numeral 1, as shown in step 12. The range is selected in a similar fashion utilizing function key S6 (range), (step 7 of FIG. 9a). When S6 is selected, the upper limit of the range representing the maximum number value of random numbers generated, is set. The upper limit is incremented by one until a maximum value of 99 is reached whereupon the maximum value wraps around to the numeral 1, as shown in step 13. The lower limit of the range is selected by utilizing function key S3 (zero). This key toggles the lower limit of the range to either 0 or 1.

Once these parameters are inputted, the user exits the "setup" mode and enters the "play" mode by selecting function key S2 (ready), (step 9). When in the "play" mode, function key S3 (play) is selected, thereby performing step 16 and the corresponding steps 16a– 16f depending on which game is selected, whereupon the microcontroller generates random numbers according to the inputted parameters and these numbers are displayed on liquid crystal display 16.

Figure 10:
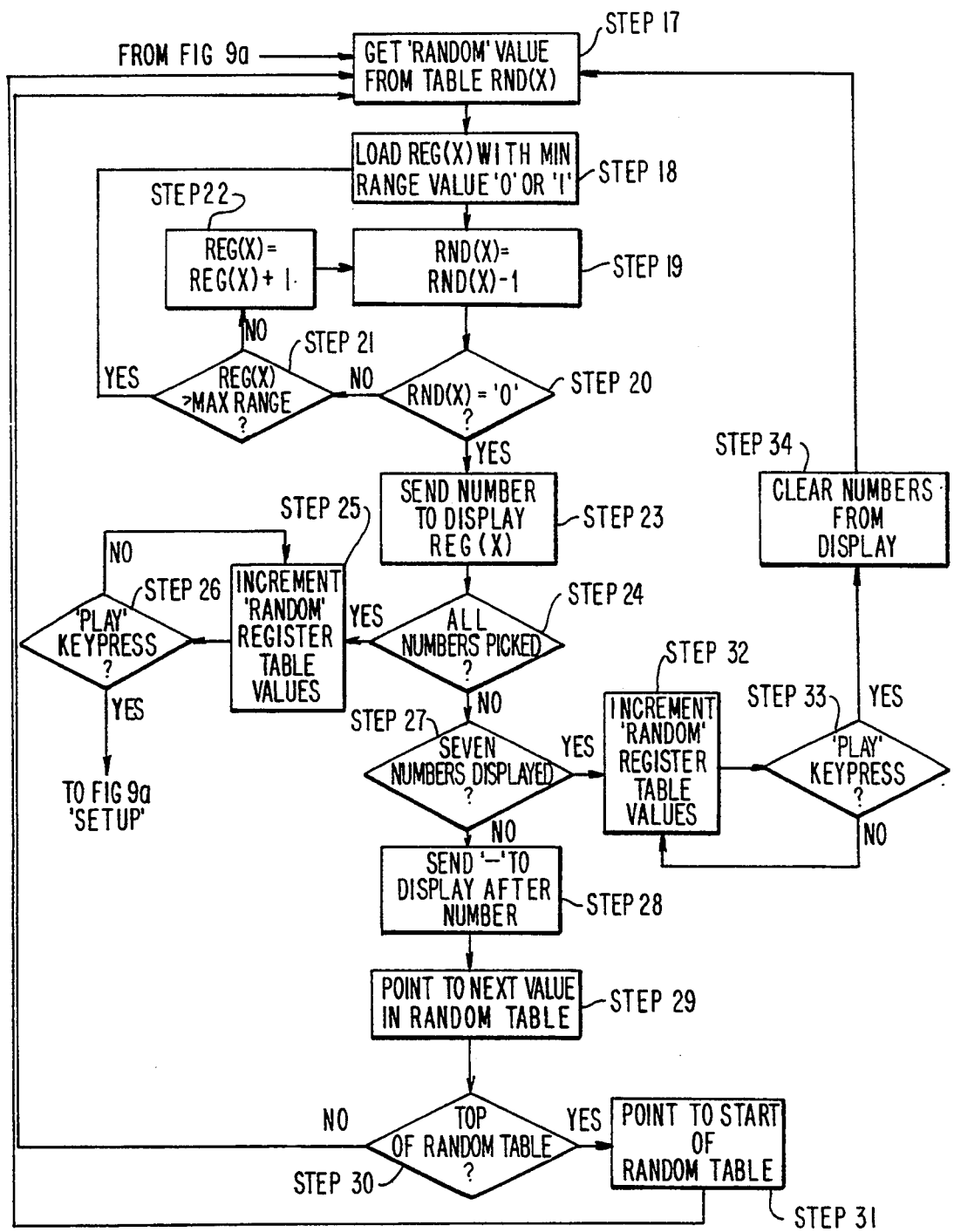
FIG. 10 is a flow chart of the device software operation for games 1 and 2.
Figure 11:
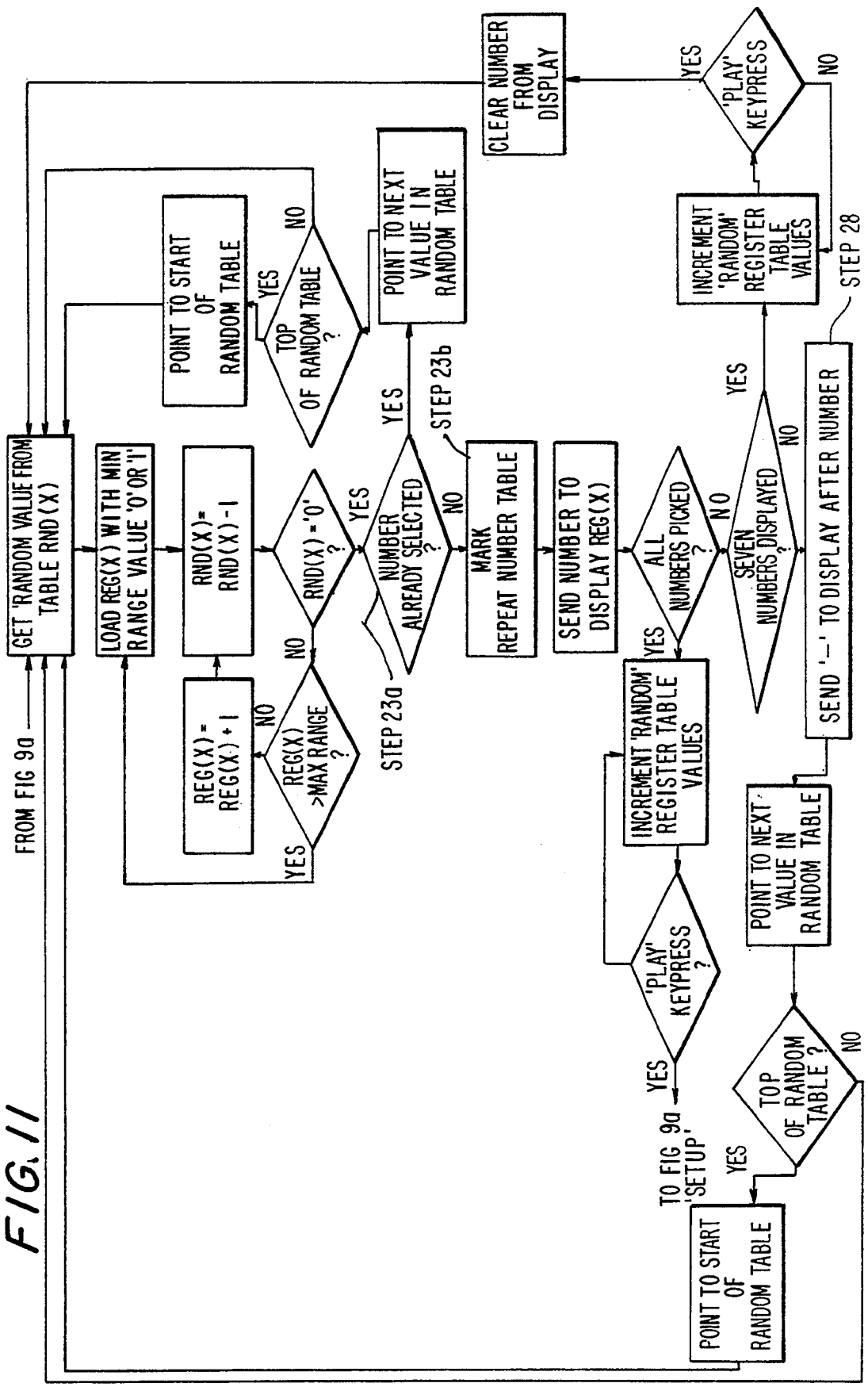
FIG. 11 is a flow chart of the device software operation for games 3 and 4.

Referring now to FIG. 10, the random number generating software will now be described. Note that FIG. 10 depicts the steps performed for generating random numbers according to games 1 and 2, i.e. "repeat" games. FIG. 11, on the other hand, depicts the steps performed for generating random numbers for games 3 and 4, i.e. "non-repeat" games. As the steps in FIGS. 10 and 11 are nearly identical with the exception of the "non-repeat" steps of FIG. 11, the steps of FIG. 10 will now be discussed and only the "non-repeat" steps of FIG. 11 will be discussed below.

As shown in FIG. 10, step 17 retrieves the current random number from a random number table stored in the microcontroller (RAM). This value is stored in register RND(x). Step 18 loads register REG(x) with the minimum range value, i.e. 0 or 1. The loop comprised of steps 19–22 function as shown and the current value stored in register REG(x) when register RND(x) equals zero is displayed on the liquid crystal display 16 as shown in step 23. When this value of register REG(x) is displayed, if this is the final number in the amount of random numbers generated, steps 24,25 and 26 will be performed. Since, in the preferred embodiment, the liquid crystal display 16 is only capable of displaying up to 7 random numbers at a given time, if the value of register REG(x) displayed is less than the amount of numbers chosen and the amount of numbers chosen is less than 7, a dash (—) is displayed on the liquid crystal display after the generated number, a new random number is stored in register RND(x) and the series of steps is repeated for generating the remaining numbers in the amount of random numbers. Note that if the amount of random numbers is greater than 7, steps 32–34 will be performed after step 27, thereby displaying the remaining numbers.

Figure 7A:
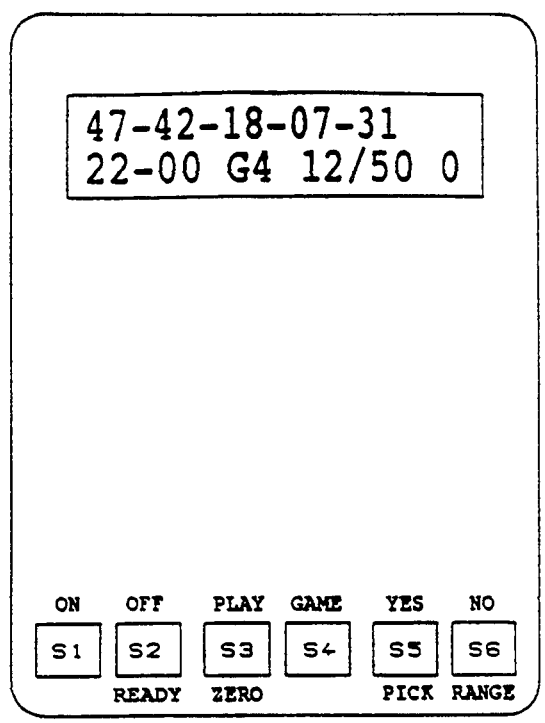
Figure 7B:
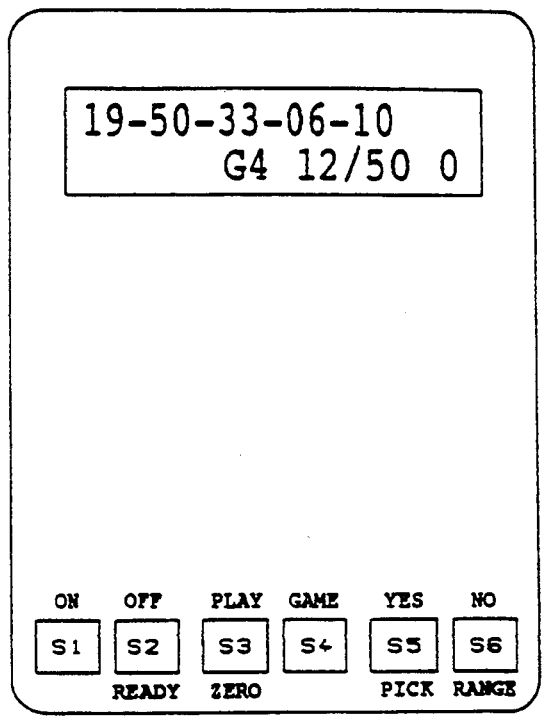

This is further illustrated in FIGS. 7a and 7b. In these figures, FIG. 7a displays random numbers generated from game 4, a "non-repeat" game, wherein the number of random numbers is 12, the maximum range value is 50 and the minimum range value is 0. FIG. 7a displays the first seven numbers. To display the remaining five numbers as shown in FIG. 7b, function key S3 (play) is selected. These five numbers remains displayed until function key S3 (play) is again selected thereby changing the liquid crystal display to the message shown in FIG. 3. From this point, the user may either (i) select another twelve random numbers in game 4 by selecting the function key S6 (no), thereby prompting the user (FIG. 5) to select function key S3 (play), (ii) select function key S5 (yes) thereby changing the parameters in game 4, (iii) choose a different game by selecting function key S4 (game) or, (iv) the user may enter the "setup" mode and input a new set of user defined parameters which will automatically replace the existing parameters for that game.

Referring now to FIG. 11, the "non-repeat" function of games 3 and 4 will now be described. As shown, after step 20 is performed and a random number is selected, steps 23a and 23b are performed which compare the selected number to the previously selected numbers in the amount of random numbers selected. This is accomplished by electronically marking the numerical value in the repeat number table when that particular numerical value is generated. Therefore, and as shown in FIG. 11, if a third random number in an amount of random numbers is chosen, before that number is displayed on the liquid crystal display, that number is compared to the previous two numbers displayed to determine if this third number is a duplicate of either the first or second number. If it is a duplicate, another random number is generated and again compared to the previous two numbers. If this other number is unique from the previous two numbers, it is displayed. If not, the loop is again repeated.

Figure 4C:
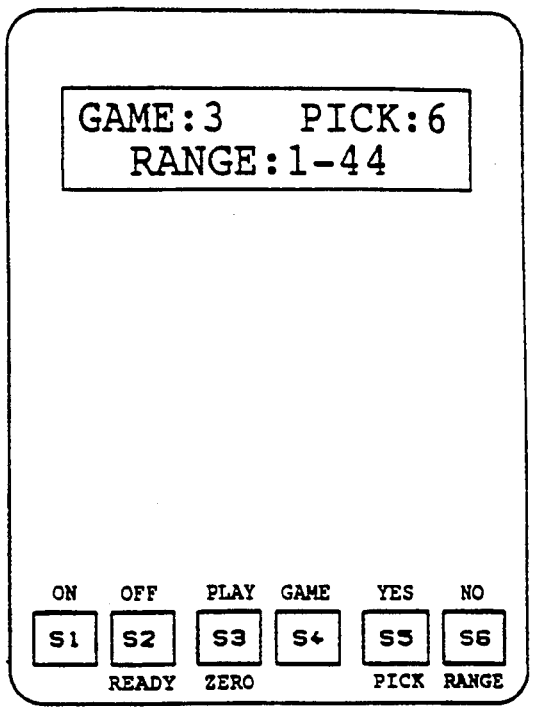
Figure 4D:
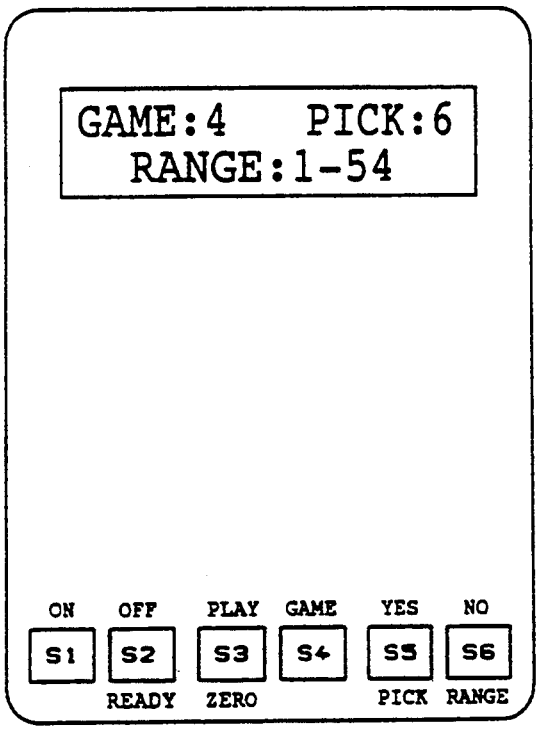
Figure 4E:
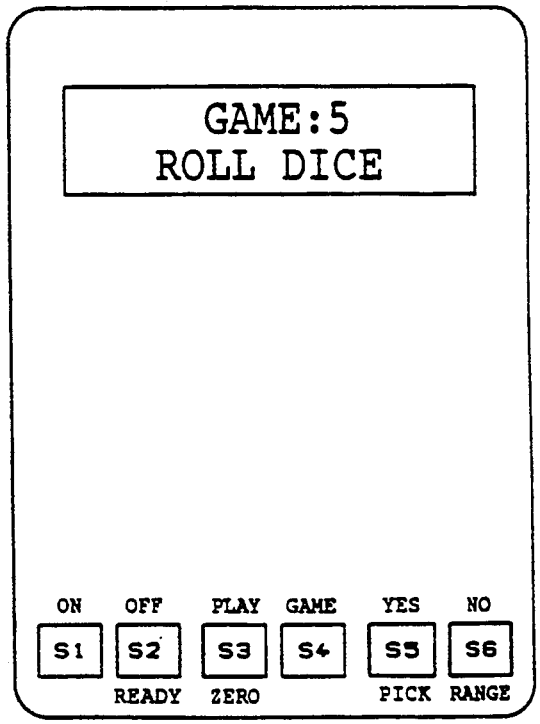
Figure 6A:
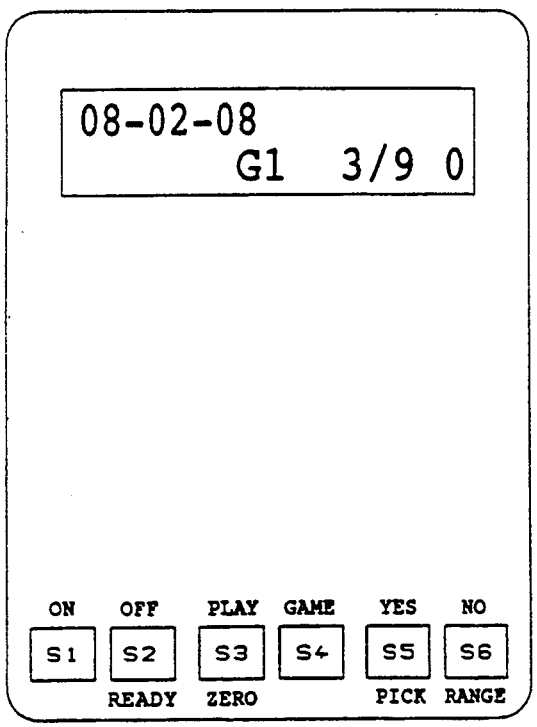
Figure 6B:
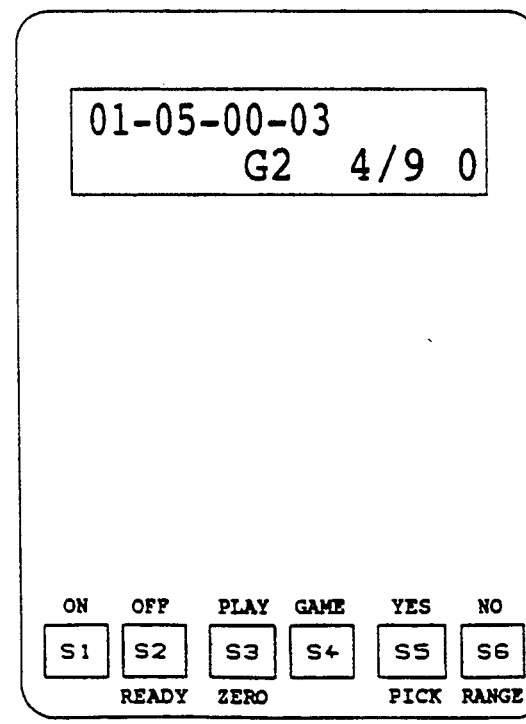
Figure 6C:
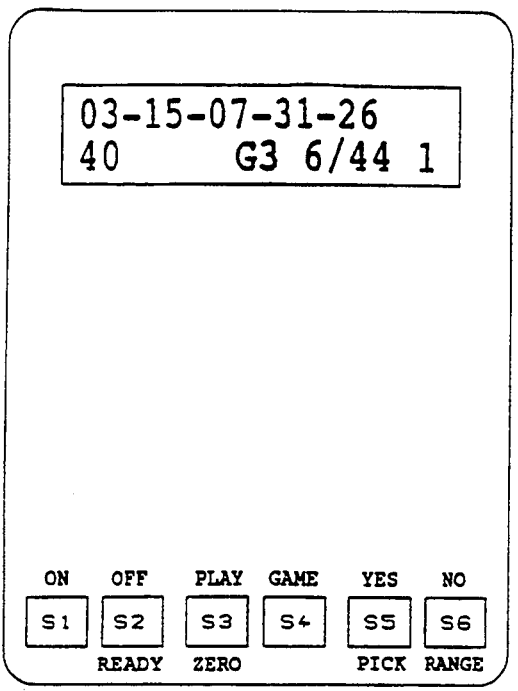
Figure 6D:
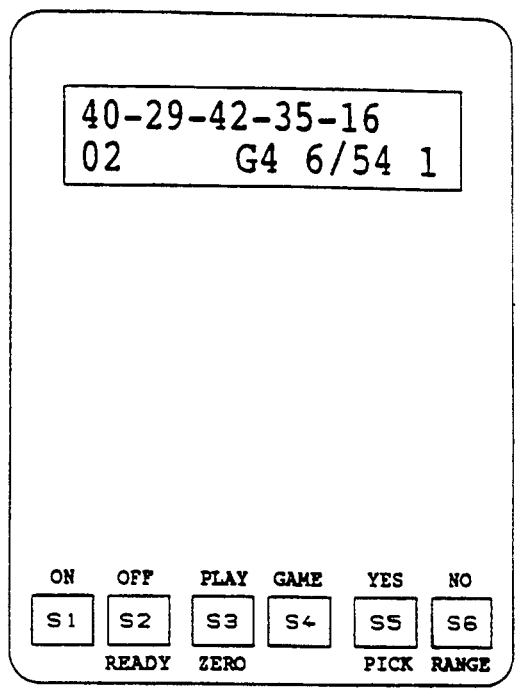

A further illustration of this process will now be described by referring to FIGS. 4c and 6c. In FIG. 4c, game 3 is selected, the number of random numbers chosen is 6 and the range has a maximum number value of 44 and a minimum number value of 1. Once the user defined parameters are inputted, the setup mode is exited by pushing function key S2 (ready) and random numbers are generated by selecting function key S3 (play). When function key S3 (play) is selected, the microcontroller will select six random numbers within the range 1–44 and will display the results on the liquid crystal display 16 as shown in FIG. 6c. As shown, the six random numbers are displayed with dashes separating them from adjacent numbers, (step 28 of FIGS. 10 and 11). Also displayed is "G3" representing game 3, "6/44" representing the quantity of numbers (6), the maximum number value of the range (44), and "1 ", representing the minimum number value of the range. Since game 3 is a "non-repeat" game, the set of six numbers generated will contain no duplicates. In contrast, and as shown in FIG. 6a, the results of playing game 1 having a number of random numbers equal to three and a range with a maximum number value of 9 and a minimum number value of 0, is depicted. Note that of the three numbers generated, two of them are duplicates.

Figure 6E:
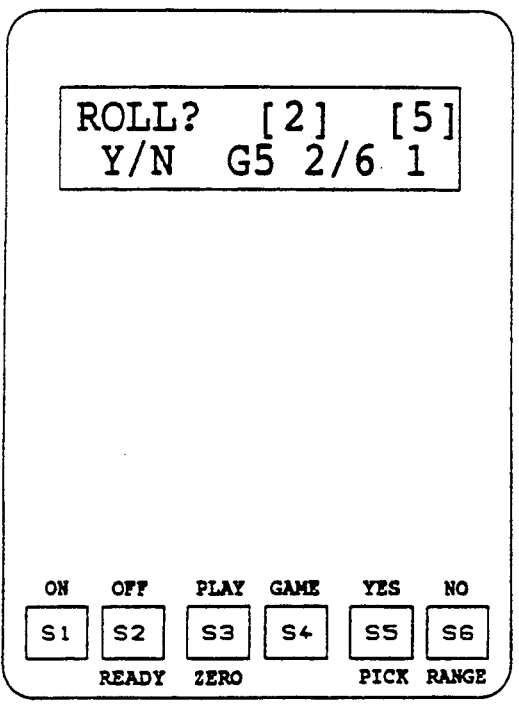
Figure 12:
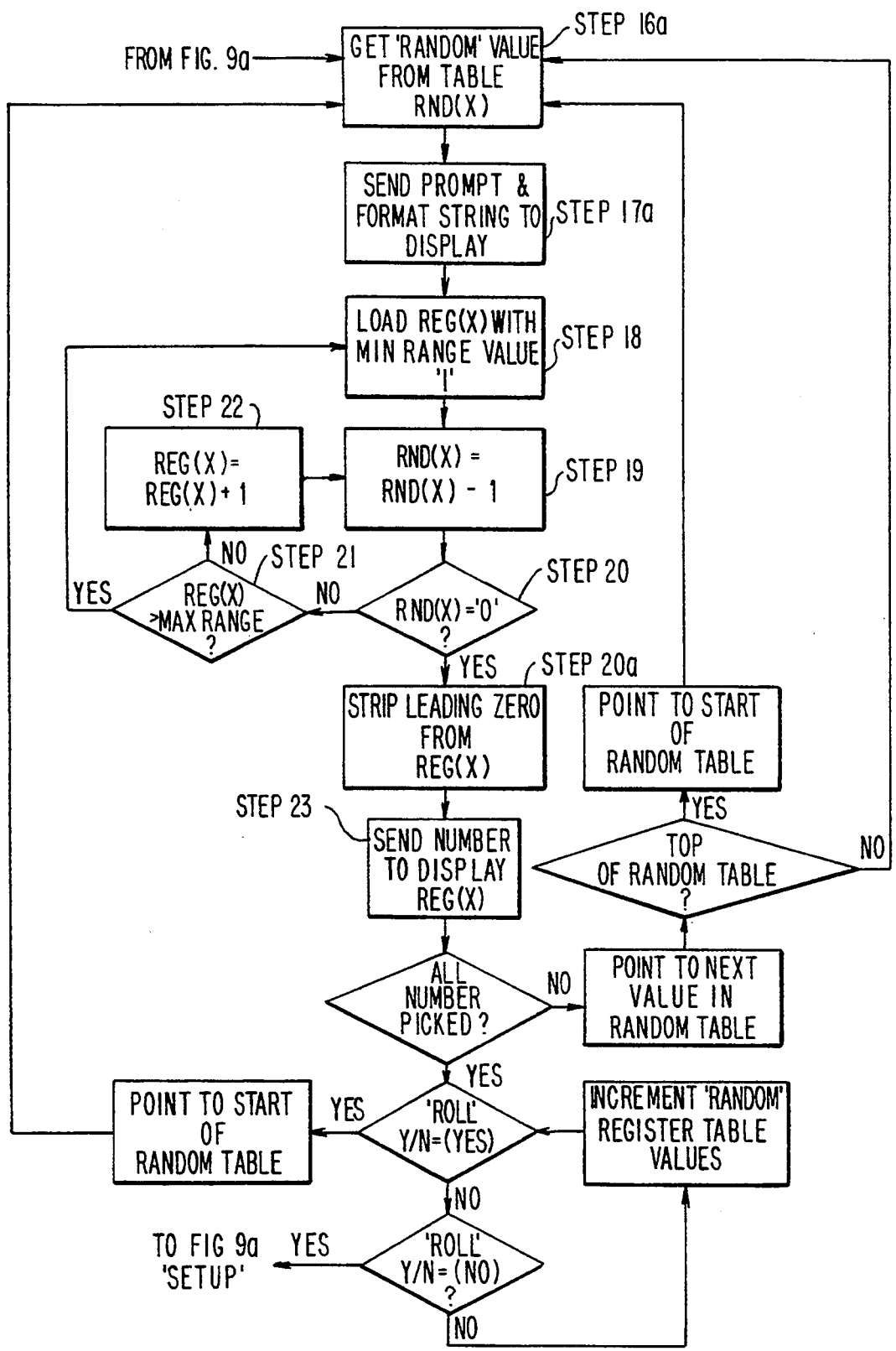
FIG. 12 is a flow chart of the device software operation for game 5.

Referring now to FIGS. 4e, 6e, 9a and 12, game 5 "dice" will now be described. As shown in FIG. 9a, after step 4 is performed, step 5 is performed which displays the screen shown in 4e. Next, and as shown in FIG. 12, after step 17 is performed, step 17a is performed which displays the message shown in FIG. 6e. As game 5 is a "dice" game, the amount of random numbers selected is 2 and the range from which these numbers are selected has a minimum value of 1 and a maximum value of 6. The minimum range value is loaded into register REG(x) as shown in step 18 of FIG. 12. The two random numbers are generated in an identical manner as explained above with the exception of step 20a, i.e. stripping the leading zero away from the random numbers generated. As shown in FIG. 6e, the two random numbers generated are displayed as single digits enclosed in brackets. Once both numbers are displayed, the device allows the user to select between returning to the "setup" mode or playing game 5 "dice" again.

Figure 4F:
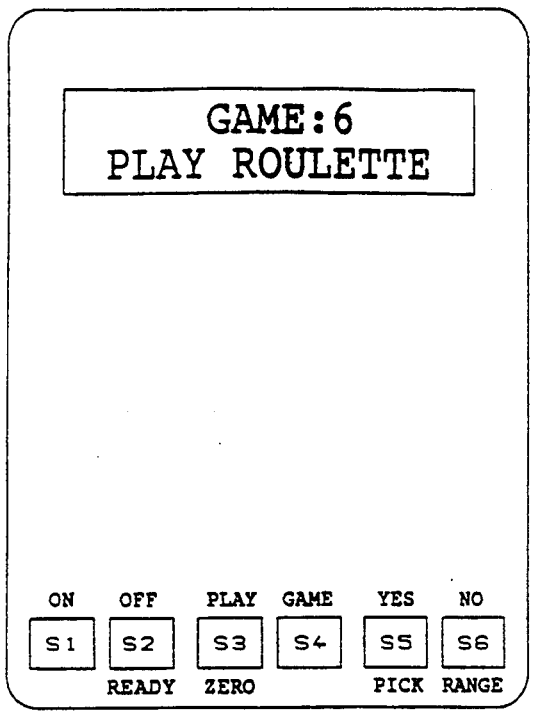
Figure 5:
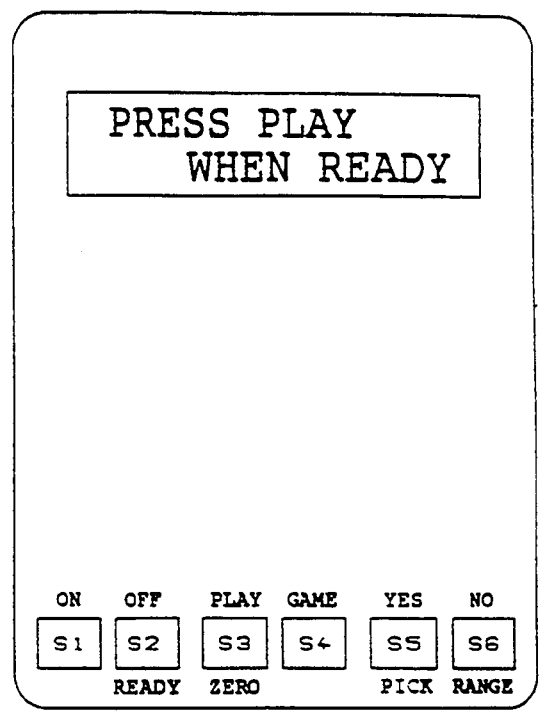
Figure 6F:
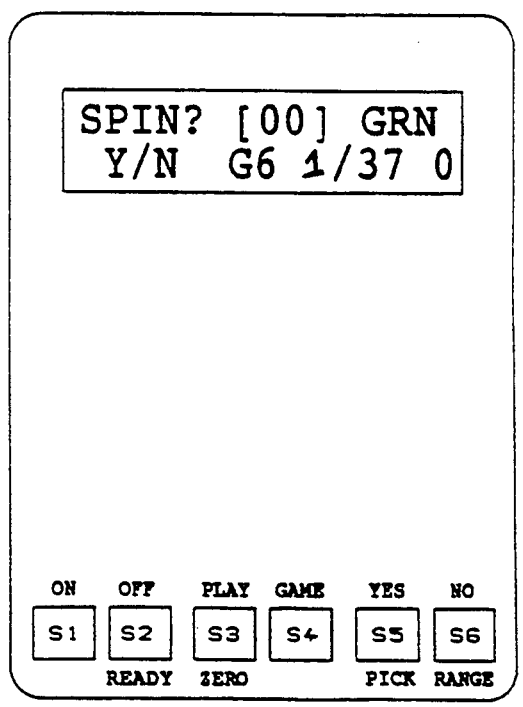
Figure 13:
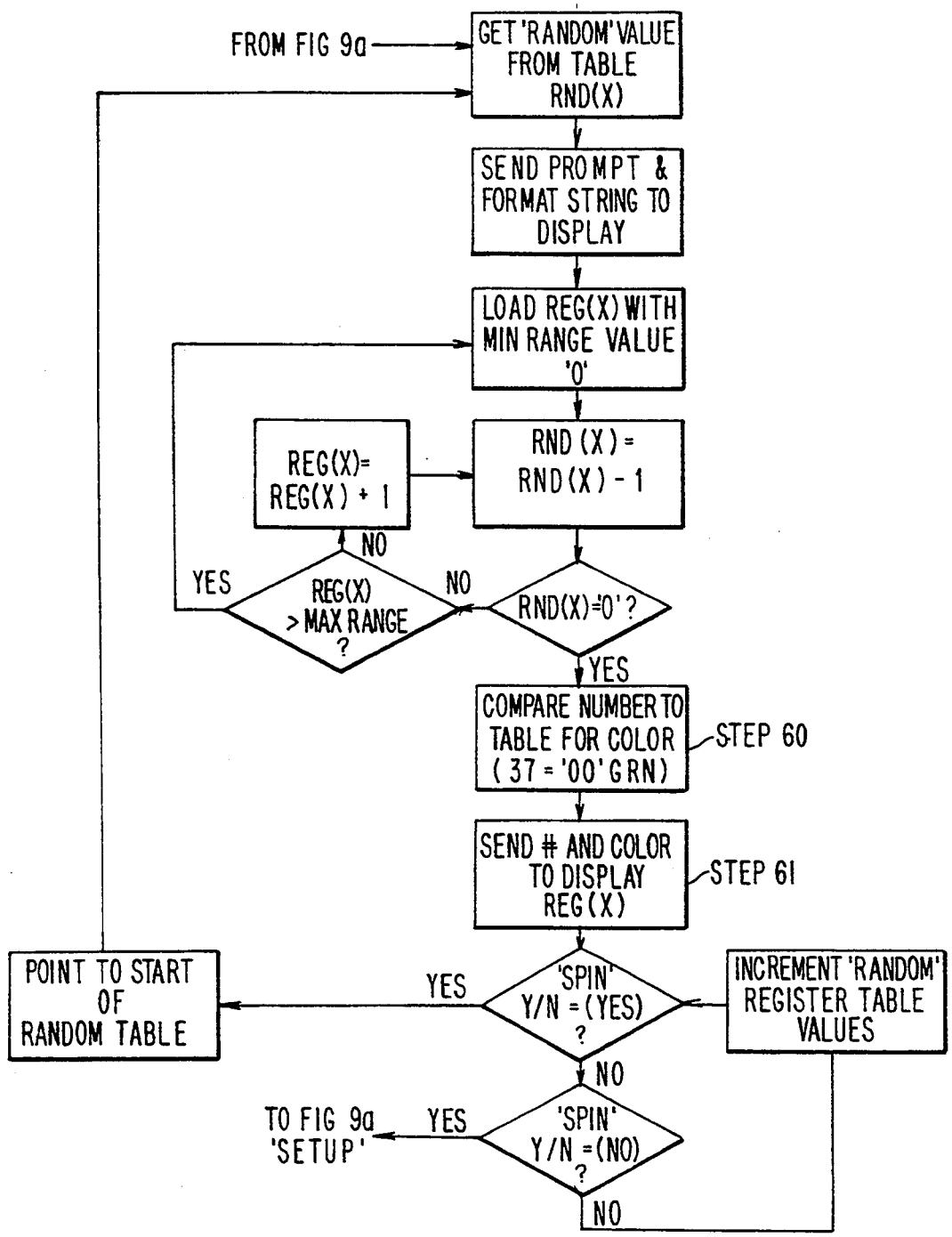
FIG. 13 is a flow chart of the device software operation for game 6.

Referring now to FIGS. 13, 4f and 6f and as stated above, game 6 generates numbers and their corresponding colors similar to the numbers and colors generated upon the spinning of a Roulette Wheel. This is accomplished by performing the steps described in the flow chart of FIG. 13. When game 6 is played, the number chosen is displayed with a three character designation corresponding to the colors RED, GREEN and BLACK, i.e. RED, GRN, BLK. This is accomplished by comparing the number generated to a look-up table stored in the microcontroller ROM (step 60 of FIG. 13). The look-up table lists the Roulette Wheel numbers 0–37, with the value 37 being assigned the value 00, and their corresponding colors. When the generated number matches the identical number on the look-up table, this number and its corresponding color are displayed on the liquid crystal display 16, as shown in FIG. 6f and as described in step 61 of FIG. 13. After each number is displayed, the user may "spin" again, (step 62) or return to the "setup" mode.

As explained above, the device provides an input/output port for interfacing with an external computer. In other words, the device may be operated in a "host" or "slave" mode. This operation is depicted in the flow chart of FIG. 9b. As shown, after the device firmware is initialized, step 70 is performed which searches the input/output port for serial devices. If a serial device, such as a computer, is present, step 71 displays the appropriate message on the liquid crystal display 16. If the device is to be operated in a "host" mode, steps 72, 72a–72d are performed. If, however, the device is to be operated in a "slave" mode, steps 73–76 are performed.

In a preferred embodiment, the device will be available nationwide and/or worldwide and, the device will contain default values comprised of pre-programmed parameters for some of games 1–4. These pre-programmed parameters will correspond to the lottery configurations in the areas which the devices are sold. For example, devices sold in the New York area will be pre-programmed for New York lotteries such as "LOTTO", where six "nonrepeat" numbers are chosen from a range of 1–52. A user may choose random numbers according to these parameters by merely selecting the corresponding game 1–4 as explained above. These pre-programmed parameters will be automatically replaced when a user inputs his own user-defined parameters.

Also in a preferred embodiment, the devices will be mass produced and will be accompanied by a user manual containing instructions for device operation. As an alternative to consulting the manual, the device will contain an on-line help feature for accessing frequently referenced user manual instructions which are permanently stored in the microcontroller memory. Furthermore, the device will, in itself, be a form of lottery. This will be accomplished by pre-programming some of the mass-produced devices with a plurality of messages to be displayed when accessed by the user. Some of these messages will correspond to a plurality of instant-win prizes. The accompanying user manual will contain a look-up table listing all the pre-programmed messages and their corresponding prizes. A user will access the pre-programmed messages and consult the user manual to determine which prize has been won. The device will also possess multi-lingual capabilities for communicating in a plurality of languages.

Although I have herein shown and described the preferred embodiment of the invention, various changes and modifications will be readily apparent to those of ordinary skill in the art who read the foregoing description. For example, a microcontroller with extended memory capabilities may be utilized thereby increasing the quantity of user-programmable games and a keyboard may be utilized instead of the function keys S1–S6 for inputting user defined parameters.

As these as well as further changes and modifications are intended to be within the scope of the present invention, the forgoing description should be construed as illustrative and not in a limiting sense, the scope of the invention being defined by the following claims.

What is claimed is:

1. A hand-held random number generating device for generating a plurality of random numbers having at least a first random number and a second random number, comprising:
- a housing having a front face portion with a display disposed thereon and connected thereto, said housing being configured for placement within a hand of a user so that said display is visible by the user when placed in the user's hand;
- a keyboard entry system connected to said housing and comprising a plurality of keys for entering at least one set of user defined parameters for said plurality of random numbers, said set of user defined parameters comprising:
  - (i) a range having a lower limit defining a minimum number value and an upper limit defining a maximum number value;
  - (ii) an amount of random numbers in said plurality of random numbers; and
  - (iii) an instruction for optionally precluding duplication of the numbers in said plurality of random numbers;
- memory disposed in said housing and connected to said keyboard entry system for storing said set of user defined parameters;
- a table having a plurality of numbers stored in said memory;
- selecting means disposed in said housing and connected to said memory for selecting a number from said plurality of numbers in said table;
- a microprocessor disposed in said housing and having an input connected to said memory for inputting said set of user defined parameters and said number selected by said selection means, and an output connected to said display, said microprocessor comprising a circuit for generating said first random number before said second random number is generated, so that the random numbers in said plurality of random numbers are generated serially.

2. The device of claim 1, wherein said microprocessor comprises a microcontroller.

3. The device of claim 2, wherein said memory comprises random access memory located within said microcontroller.

4. The device of claim 3, wherein said random access memory is arranged and constructed to store at least four sets of user defined parameters.

5. The device of claim 1, wherein said lower limit of said range being one of 0 and 1.

6. The device of claim 5, wherein said upper limit of said range being an integer value between said lower limit and 99.

7. The device of claim 1, wherein said at least one set of user defined parameters comprises at least four sets of user defined parameters.

8. The device of claim 1, wherein said display comprises a liquid crystal display.

9. The device of claim 1, further comprising multiple general purpose output ports accessible on said housing for interfacing said device with at least one of external printers and computers.

10. The device of claim 1, further comprising:
- an external look-up table having a plurality of messages and their corresponding prizes;
- a programmed message stored in said memory; and
- means for displaying said programmed message on said display for comparing said programmed message to said plurality of messages in said look-up table for determining which prize is won.

11. The device according to claim 1, wherein default values for at least one of said lower limit, said upper limit, said amount of random numbers and said instruction are stored in said memory and wherein said default values are replaced by said user defined parameters when entered by said input means.

12. The device according to claim 11, wherein said default values correspond to at least one selected State's lottery game.

13. A hand-held random number generating device for generating a plurality of random numbers having at least a first random number and a second random number, comprising:
- a housing having a front lace portion with a display disposed thereon and connected thereto said housing being configured for placement within a hand of a user so that said display is visible by the user when placed in the user's hand:
- a keyboard entry system connected to said housing and comprising a plurality of keys for entering at least one set of user defined parameters for said plurality of random numbers, said set of user defined parameters comprising,
  - (i) a first range having a first lower limit defining a minimum number value and a first upper limit defining a maximum number value;
  - (ii) an amount of random numbers in said plurality of random numbers; and
  - (iii) art instruction for optionally precluding duplication of numbers when said amount of random numbers exceeds 1;
- a memory disposed in said housing for storing said at least one set of user defined parameters and
- for storing a first and second set of predetermined parameters, said first set of predetermined parameters comprising;
  - (i) a second range having a second lower limit defining a minimum number value equal to 1 and a second upper limit defining a maximum number value equal to 6; and
  - (ii) an amount of random numbers equal to 2, and said second set of predetermined parameters comprising;
  - (i) a third range from which said amount is generated having a third lower limit defining a minimum number value equal to 0 and a third upper limit defining a predetermined maximum number; and
  - (ii) an amount of random numbers equal to 1;
- a table having a plurality of numbers stored in said memory;
- selecting means connected to said memory for selecting one of the numbers in said table and one of said set of user defined parameters, first set of predetermined parameters and second set of predetermined parameters;
- a microprocessor responsive to said selecting means, said microprocessor comprising a circuit for generating said first random number before said second random number is generated, so that the random numbers in said plurality of random numbers are generated serially;
- a look-up table wherein when said selecting means selects said second set of predetermined parameters, each generated number is assigned one designation from a predetermined set of designations;
- means for comparing said number generated, when said selecting means selects said second set of predetermined parameters to said numbers in said lookup table for determining the assigned designation; and means for outputting to said display said generated random numbers and, when said selecting means selects said second set of predetermined parameters said assigned designation.

14. The device of claim 13, wherein said comprises a microcontroller.

15. The device of claim 14, wherein said memory comprises random access memory located within said microcontroller.

16. The device of claim 15, wherein said random access memory is arranged and constructed to store at least four sets of user defined parameters.

17. The device of claim 14, wherein said memory further comprises read only memory located within said microcontroller and wherein said first and second sets of predetermined parameters are stored in said read only memory.

18. The device of claim 17, further comprising user assistance instructions stored in said memory for displaying said assistance instructions on said display for assisting a user in device operation.

19. The device of claim 13, wherein said lower limit of said at least one set of user defined parameters being one of 0 and 1.

20. The device of claim 13, wherein said first upper limit of said first range being an integer value between said lower limit and 99.

21. The device of claim 13, wherein said at least one set of user defined parameters comprises at least four sets of user defined parameters.

22. The device of claim 13, wherein said display comprises a liquid crystal display.

23. The device according to claim 13; wherein said predetermined maximum number of said third upper limit corresponds to the value 00 on a Roulette Wheel.

24. The device of claim 13, wherein when said instruction of said set of user defined parameters is inputted, duplication of said numbers in said amount of random numbers is precluded.

25. The device of claim 13, wherein default values for at least one of said first lower limit, said first upper limit, said amount of random numbers and said instruction are stored in said memory anti wherein said default values are replaced by said user defined parameters entered by said keyboard entry system.

26. The device according to claim 25, wherein said default values correspond to at least one selected State's lottery.

* * * * *